United States Patent [19]
Habert

[11] 4,059,083
[45] Nov. 22, 1977

[54] METHOD AND APPARATUS FOR OBTAINING AN AUTOMATIC IGNITION ADVANCE IN AUTOMOBILE INTERNAL COMBUSTION ENGINE

[75] Inventor: Roger J. Habert, Epinay, France

[73] Assignee: Ducellier & Cie, Paris, France

[21] Appl. No.: 675,279

[22] Filed: Apr. 9, 1976

Related U.S. Application Data

[63] Continuation-in-part of Ser. No. 406,273, Oct. 15, 1973, abandoned, which is a continuation-in-part of Ser. No. 223,627, Feb. 4, 1972, Pat. No. 3,783,850, which is a continuation-in-part of Ser. No. 835,661, June 23, 1969, abandoned.

[51] Int. Cl.$^2$ .............................. F02P 3/02; F02P 1/08
[52] U.S. Cl. ........................ 123/146.5 A; 123/148 E; 123/117 R
[58] Field of Search ..................... 123/117 R, 146.5 A, 123/148 E

[56] References Cited
U.S. PATENT DOCUMENTS

| | | | |
|---|---|---|---|
| 3,559,629 | 2/1971 | Sauvignet | 123/148 E |
| 3,592,178 | 7/1971 | Schiff | 123/148 E |
| 3,738,339 | 6/1973 | Hentginger et al. | 123/146.5 A |
| 3,756,212 | 3/1971 | Schirmer | 123/117 R |
| 3,811,420 | 5/1974 | Vogel | 123/117 R |

Primary Examiner—Ronald H. Lazarus
Assistant Examiner—P. S. Lall
Attorney, Agent, or Firm—Imirie, Smiley & Guay

[57] ABSTRACT

Method and apparatus for providing ignition advance in an internal combustion engine in which a voltage generator supplies a voltage $V_1$ applied to a first terminal of a pulse generator, and a tachometer generator supplies a voltage $V_2$ applied to a second terminal of the pulse generator. The pulse generator in turn produces a pulse which controls the ignition upon the coincidence of voltage $V_1$ with $V_2$. A third signal $V_3$, dependent on at least one of the parameters of operation of the engine, such as temperature or vacuum, is added to voltage $V_1$ so that when $V_1$ plus $V_3$ coincides with $V_2$, an ignition pulse is produced that triggers the ignition spark at that instant.

1 Claim, 6 Drawing Figures

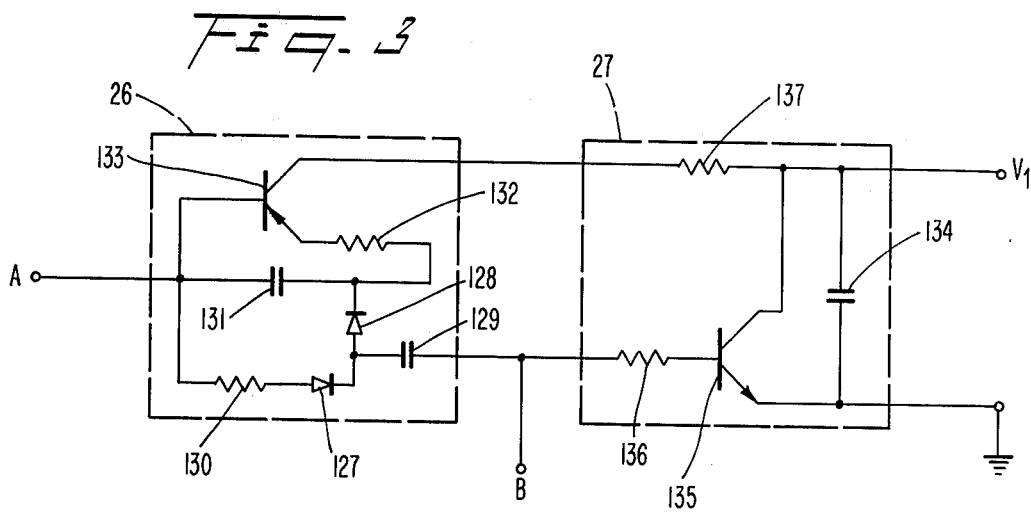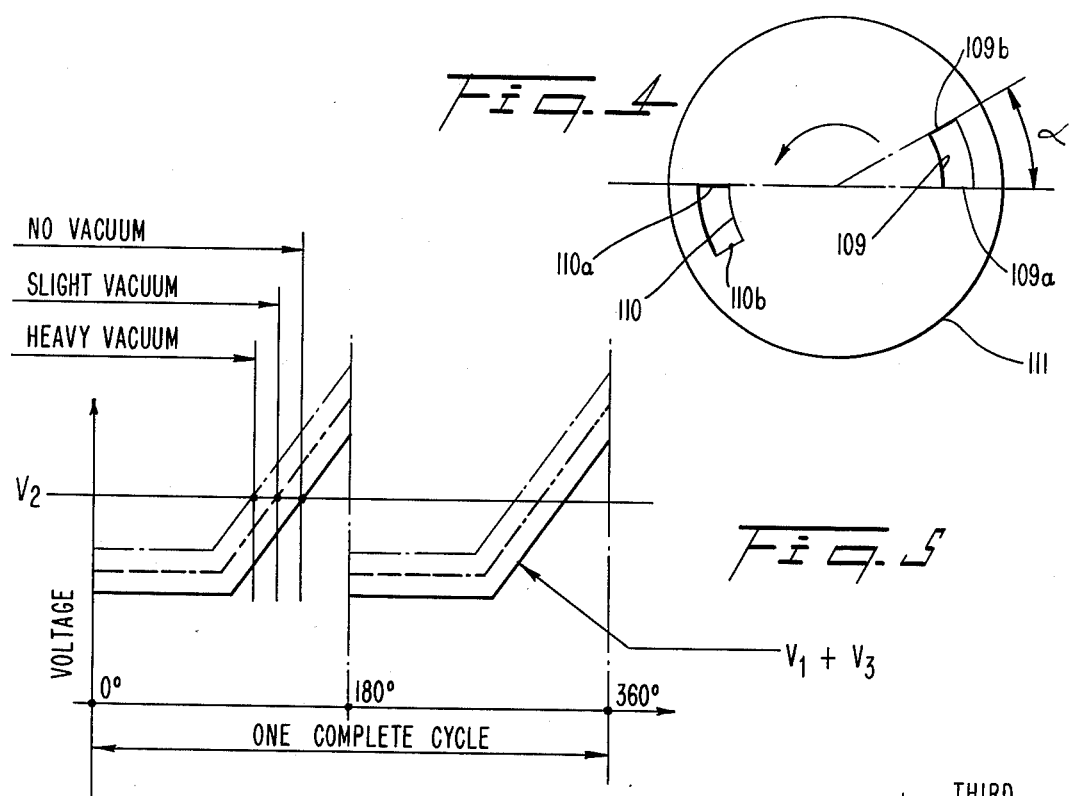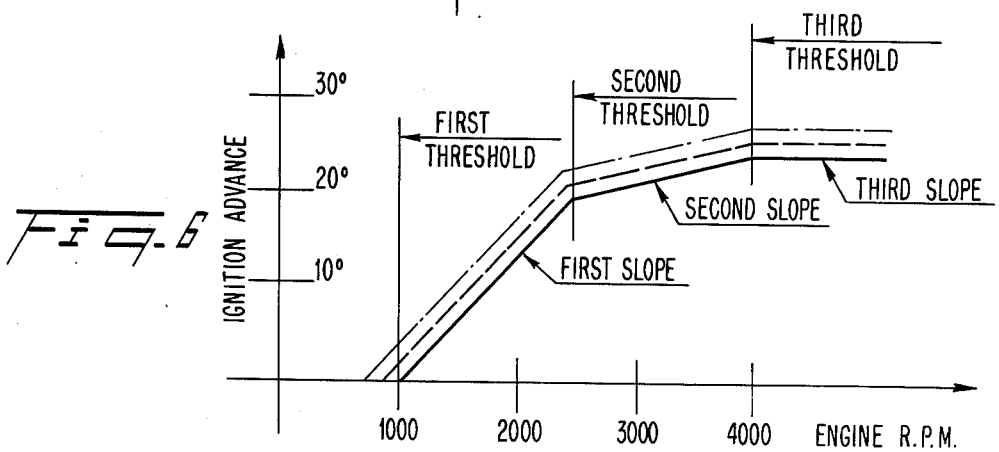

METHOD AND APPARATUS FOR OBTAINING AN AUTOMATIC IGNITION ADVANCE IN AUTOMOBILE INTERNAL COMBUSTION ENGINE

CROSS REFERENCE TO RELATED APPLICATIONS

This application is a continuation-in-part of copending application Ser. No. 406,273, filed Oct. 15, 1973, now abandoned, which is a continuation-in-part of copending application Ser. No. 223,627, filed Feb. 4, 1972, now U.S. Pat. No. 3,783,850, which in turn is a continuation-in-part of copending application Ser. No. 835,661, filed June 23, 1969, now abandoned.

BACKGROUND OF THE INVENTION

My above-referenced U.S. Pat. No. 3,783,850 relates to a method of obtaining an automatic ignition advance as a function of the speed of rotation of an internal combustion engine such as employed in an automobile. The method is characterized in that, linearly or not depending upon the desired control of advance, a voltage $V_1$ proportional to an angular offset $\alpha$, measured as an angle between a reference position of the engine flywheel and a variable position of the same flywheel, is compared to a voltage $V_2$ proportional to the rate of change of rotation of the engine. Voltage $V_1$ increases with angular offset $\alpha$ from the given reference position and when it coincides with voltage $V_2$, there is produced an ignition pulse which triggers the ignition spark at that instant. As a result, a relationship is established by means of parametric ratios of voltages $V_1$ and $V_2$, between angular offset $\alpha$ and the engine R.P.M., which is made to correspond with the relationship dictated by the desired advance curve.

The device for implementing the above-described method of the patent is characterized in that it comprises a voltage generator for producing a voltage $V_1$ proportional to the angular offset $\alpha$, which is applied to a first terminal of a pulse generator, and a tachometric generator for producing a voltage $V_2$ proportional to the speed, which is applied to a second terminal of the pulse generator. In turn, the pulse generator produces a pulse controlling the ignition whenever voltage $V_1$ coincides with voltage $V_2$, consideration being given to a proportionality factor.

SUMMARY OF THE INVENTION

In view of the above as a foreword, the purpose of the present invention is to improve the method for obtaining an automatic ignition advance as claimed in the above patent by adding at least one of the parameters of operation of the engine so as to increase the possibility of obtaining ignition advance curves in compliance with the different laws that control the proper operation of an internal combustion engine, and by changing rapidly at least one of the two voltages $V_1$ and $V_2$ so as to render the method impervious to parasitic disturbances.

For this purpose, the present invention relates to a method of automatic ignition advance according to the above patent characterized in that there is added to the voltage $V_1$ a voltage $V_3$, variable or not, which is affected by at least one of the parameters of operation of the internal combustion engine so that when the combined voltage of $V_1$ and $V_3$ coincides with voltage $V_2$, consideration being given to a proportionality factor, an ignition pulse is produced which triggers the ignition spark at that instant.

The device for implementing the method described above includes a voltage signal generator comprising a generator of current the intensity of which is proportional to the speed of rotation of the internal combustion engine, and an integrator element which receives rectangular input signals from an engine speed detector by means of a shaping device and also receives a voltage signal provided by a sensing device, variable or not, controlled by at least one of the operating parameters of the internal combustion engine. In this manner, a voltage proportional to engine advance or angular offset $\alpha$ is applied to one input of a pulse generator. A tachometric generator supplying a voltage proportional to the engine speed is applied to another input of the pulse generator, which produces a pulse to control engine ignition when the two inputs coincide in value, consideration being given to a proportionality factor. The pulse generator is also controlled by a monostable multivibrator which at the initial setting point delivers a signal to the ignition device by means of an amplifier. Furthermore, a switching circuit influenced by the pulse controlling the ignition circuit is connected between the output of the amplifier and at least one of the inputs of the comparator to isolate the circuit from spurious signals.

It is therefore an object of the invention to provide an improved method and apparatus for obtaining an automtic ignition advance in an automobile internal combustion engine.

It is a further object and advantage of the invention to provide various voltages derived from characteristics of the operation of an internal combustion engine for more appropriately triggering the ignition spark at a proper instant determined as a point in time from parameters of the operation characteristics of the engine.

BRIEF DESCRIPTION OF THE DRAWINGS

FIGS. 2 and 3 are schematic circuit diagrams of the network of FIG. 1;

FIG. 4 is a side elevational view of the engine speed detecting disc of the circuit of FIG. 2; and FIGS. 5 and 6 are curves illustrative of the operation of the circuit of FIGS. 2 and 3.

DETAILED DESCRIPTION OF THE INVENTION

Figure 1:
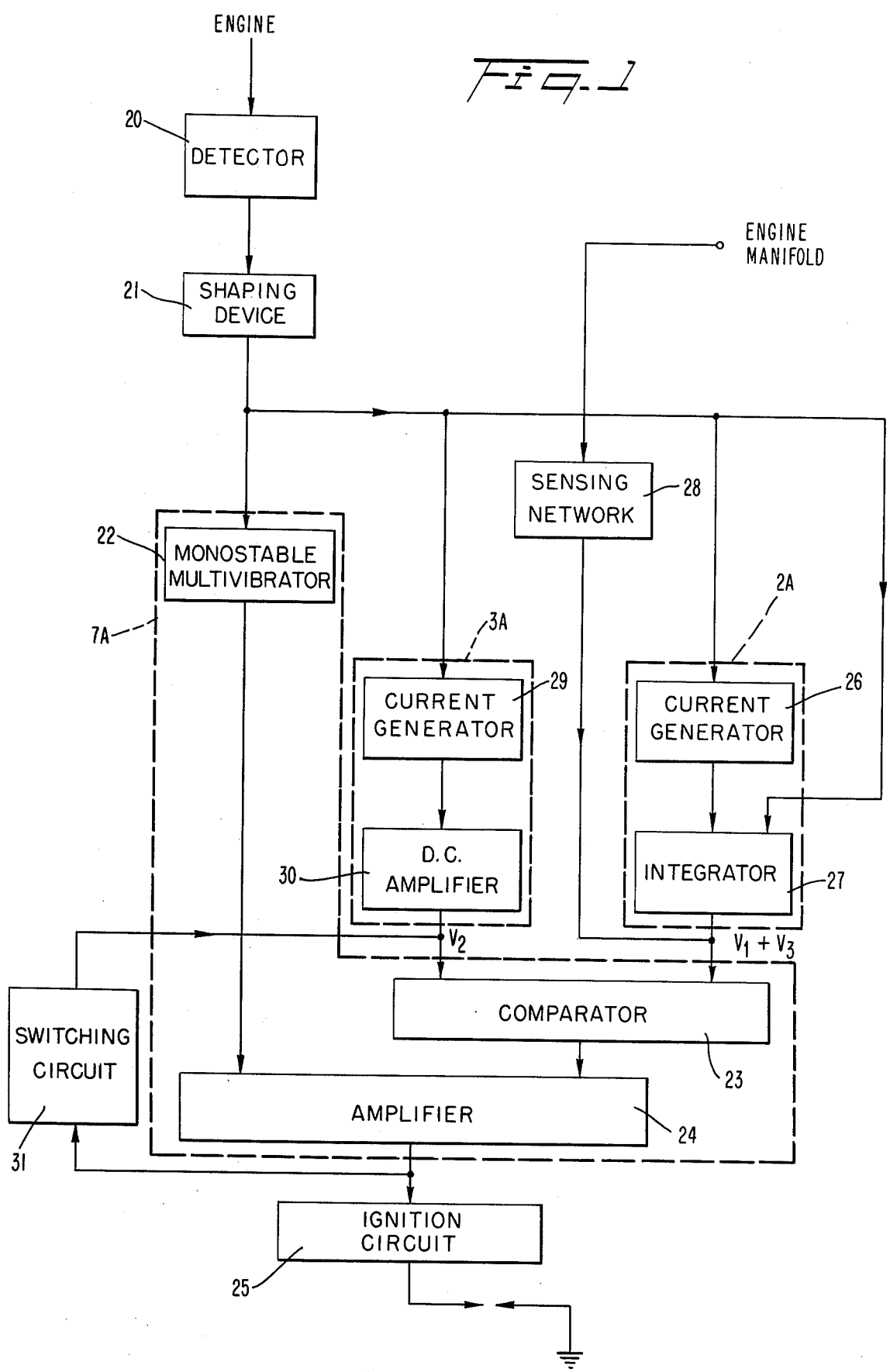
FIG. 1 is a block diagram of a preferred embodiment of apparatus for obtaining an automatic advance in an automobile internal combustion engine according to the present invention.

Referring now to FIG. 1, detector 20 provides a series of pulses proportional in width to engine speed and may be mechanical in nature, as shown in my U.S. Pat. No. 3,783,850, optical or magnetic, as shown in U.S. Pat. No. 3,314,407, or electronically capable of detecting gaps provided on a conventional disc driven, for instance, by a main drive shaft of the internal combustion engine. Such a disc arrangement causes the generation of both a reference signal and an initial setting point signal and is described in greater detail hereinbelow.

A shaping device 21 receives the signal emitted by detector 20 and transforms it into a rectangular signal or squarewave signal, the leading edge being triggered by the passage of the initial setting point of the disc and the trailing edge being controlled by a reference point of the disc. It is within the purview of the present invention that shaping device 21 could be incorporated into the detector 20.

The output of shaping device 21 is connected to voltage generator 2A, which may be of the general type shown as generator 2 in my U.S. Pat. No. 3,783,850 for supplying a voltage $V_1$ and $V_3$, and to tachometric generator 3A, which may be of the general type shown as generator 3 in my U.S. Pat. No. 3,783,850 for supplying a voltage $V_2$. The output of shaping device 21 is also fed to a monostable multivibrator 22, of any conventional type, which is part of a pulse generator 7A. Pulse generator 7A comprises a comparator 23, which may be of the general type shown in U.S. Pat. No. 3,314,407, for comparing voltage $V_1$ plus $V_3$ and voltage $V_2$, having one input connected to voltage generator 2A and the other connected to tachometric generator 3A.

The output of comparator 23 is connected to one of the inputs of an amplifier 24 which has its other input connected to the output of the monostable multivibrator. The output of amplifier 24 is connected to the input of an electronic ignition network 25.

Voltage generator 2A comprises a current generator 26 which, from the pulse signals emitted by shaping device 21, supplies an integrator 27 with a current the value of which is proportional to the speed of rotation of the internal combustion engine, consideration being given to a proportionality factor or constant.

Integrator 27 supplies a voltage signal $V_1$ proportional to the angle of rotation of the main shaft of the engine. To $V_1$ is added a voltage $V_3$ emanating from a sensing device 28, which voltage $V_3$ is controlled by at least one of the parameters of engine operation such as for instance the vacuum formed in the intake manifold and/or the temperature measured at any point of the engine.

Tachometric generator 3A comprises current generator 29 which, from the signals emitted by shaping device 21, supplies a D.C. amplifier 30 with a current the value of which is proportional to the speed of rotation of the internal combustion engine, consideration being given to a constant. D.C. amplifier 30 provides a voltage signal $V_2$ as a function of the speed of rotation of the engine from current generator 29, hence $V_2 = f(\omega)$.

Switch or reaction circuit 31 may be of any well known type and is connected on one hand to output of amplifier 24 and, on the other hand, to at least one of the inputs of comparator 23. Circuit 31 is responsive to the pulse output of the amplifier 24 controlling the ignition and feeds back a signal which reinforces said pulse so that the device becomes impervious to spurious conduction and radiation signals.

The operation of the circuit is as follows:

The integrator supplies voltage $V_1$ proportional to the angle of rotation of the main shaft derived from the current provided by current generator 26. This current, which is in the form of a train of pulses, periodically charges and discharges the integrator. The beginning of charge is triggered by the reference portion of the pulse signals from shaping device 21. After a period of time $t$, corresponding to an angular rotation $\alpha$ of the engine shaft, the voltage at the terminals of the integrator has a value $V_1 = It/C$, where $C$ is the integrator capacitance.

Since $t = \alpha/\omega$, and $I = K\omega$, where $K$ is a constant and W is the rotational speed of the engine, it follows that:

$$V_1 = (KW\alpha/CW) = K\alpha/C$$

or, replacing $K/C$ by $\lambda$:

$$V_1 = \lambda\alpha$$

Thus, the voltage $V_1$ obtained at the terminals of the integrator is proportional to angle $\alpha$ independently of the speed of rotation. Each passage of the disc in front of the initial setting point discharges the integrator until the subsequent reference signal is received.

The initial value of $V_1$ is determined by the desired advance while voltage $V_3$ is dependent on at least one of the engine operation parameters, for instance the vacuum existing in the intake manifold. Therefore, except during the starting and idling stages during which the ignition device which triggers the spark is fed directly by the monostable multivibrator 22 by means of the amplifier 24, the present invention permits the derivation of a first threshold equal to $V_1$ which is added voltage $V_3$ so that $V_1$ and $V_3$ compared to $V_2$ by means of the comparator 23 results by way of the amplifier 24 and ignition device 25 in the triggering of the ignition spark when the voltages are coincident.

Furthermore, in order to prevent any erratic operation of the comparator caused by parasitic noises that could for instance originate with the ignition spark, a rapid variation of at least one of the voltages $V_1$ plus $V_3$ and $V_2$ is initiated by a trigger device or reaction circuit 31 connected on one hand to the output of the amplifier 24 and on the other hand to at least one of the inputs of the comparator 23. The signal fed back to the comparator by this circuit precludes the generation of a comparator output wherever an ignition spark is produced.

Figure 2:
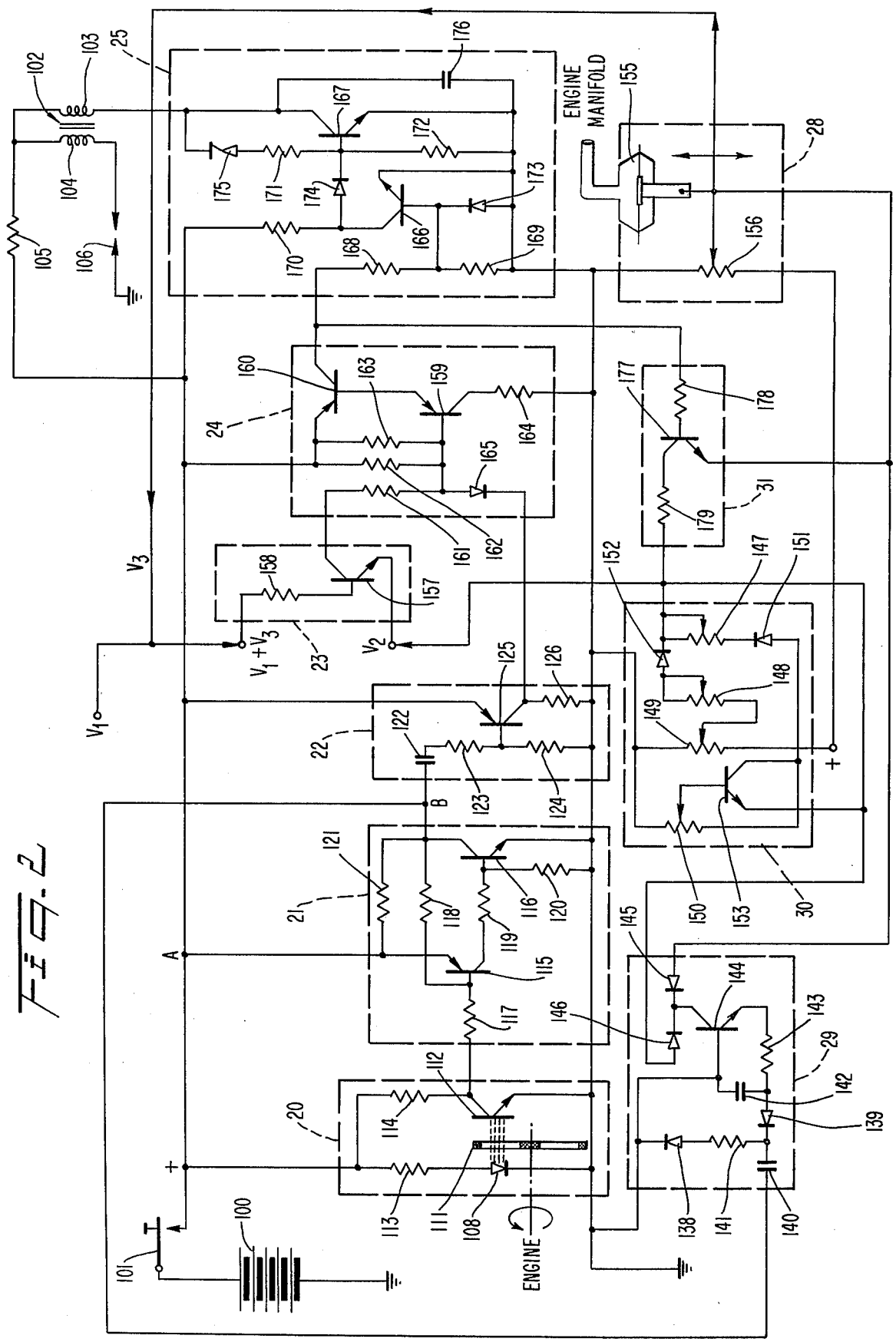

Referring to the circuit in detail, FIG. 2 is a schematic representation of the invention in which a battery 100 on board a vehicle is connected to the ignition switch of the internal combustion engine (not shown). The engine has an ignition coil 102 which comprises in a known fashion a primary winding 103, a secondary winding 104 and a limiting resistor 105. Coil 102 is intended to supply a high voltage to the spark plug 106, distribution to the spark plugs of different cylinders being performed by means of a conventional distributor (not shown).

According to a preferred embodiment, detector 20 comprises a light emitting diode 108 which activates a photo-transistor 112 through openings 109 and 110 provided in an opaque disc 111 (see FIG. 4). In this embodiment, disc 111 is driven at the speed of the internal combustion engine such that edges 109a and 110a of the respective openings define the points of initial setting and edges 109b and 110b define the reference points. Angle $\alpha$ between these points defines the ignition advance amplitude while disc 111 revolves in the counter-clockwise direction shown by the arrow. Resistances 113 and 114 (FIG. 2) are current limiting resistances. The output of detector 20, from the collector of transistor 112, is fed to the shaping device 21 which comprises a transistor 115 for amplifying the signal supplied by the phototransistor, a transistor 116, and resistances 117, 118, 119, 120 and 121. Resistance 118 provides a feedback signal to the base of transistor 115 resulting in a triggering or switching effect. The shaping device 21 receives the signal emitted by detector 20 and transforms it into a rectangular signal, the leading edge of which is controlled by passage of initial setting points 109a and 110a (FIG. 4) of the disc in front of the light emitting diode 108, the trailing edge likewise being controlled by points 109b and 110b. The output of the shaping device 21 is fed to the input of the current generator 26 of generator network 2A which produces voltages $V_1$ and $V_3$, the current generator 29 of tachometric generator network 3A which produces voltage $V_2$, and the monostable multivibrator 22.

Monostable multivibrator 22 comprises a condenser 122, a voltage dividing bridge made of resistors 123 and 124, a transistor 125, and a resistor 126, and creates a pulse of about 0.001 second in duration each time the point of initial setting of disc 111 passes in front of diode 108. As will be more fully described below, this pulse controls the electronic ignition circuit 25 at low speeds of rotation when the advance should be practically equal to zero.

The voltage generator 2A, connected to receive the output of the shaping device 21, comprises a current generator 26 and an integrator 27 (see FIG. 3). Current generator 26 consists of a diode-pump comprising diodes 127 and 128 condenser 129, a current limiting resistor 130, a filter circuit comprising a condenser 131 and a resistor 132, and a transistor 133 the emitter of which limits the voltage at the terminals of condenser 131 to 0.6 volts. The current generator 26 supplies a current signal which is in proportion with the rotational speed of the engine according to the formula: $I + Kw$ (I in amps, K in amps/radians/sec, and w the rotational speed of disc 111 driven by the engine).

This current is produced through the action of the diode-pump from the rectangular signals supplied by the shaping device 21 at output B (see FIGS. 2 and 3), and is fed to integrator 27. Integrator 27 essentially comprises a condenser 134 which is periodically charged by the current supplied by generator 26. Condenser 134 is discharged during the time photo-transistor 112 of detector 20 is inactive, which duration corresponds to the time the opaque area of the disc 111 between edges 109a and 110b, and edges 109b and 110a passes in front of diode 108. The discharge of condenser 134 is the result of its being short-circuited by means of transistor 135 the base of which is connected to point B (see FIGS. 2 and 3) by way of resistor 136 and the collector of which is connected to the collector of transistor 133 by means of resistor 137. Transistor 135 is controlled at its base by transistor 116 of shaping device 21 (see FIG. 2) to which it is connected at point B.

In operation, the integrator produces a voltage $V_1$ proportional to the angle of rotation of the crankshaft in response to the current I supplied by generator 26. Current I charges condenser 134. The beginning of the charge coincides with the passage of edge 109b or 110b of disc 111 in front of diode 108. After a lapse of time T corresponding to an angular rotation $\alpha$, the voltage at the terminals of condenser 134 will have charged to:

$$V_1 = (Q/C) = (It/C)$$

since $t = \alpha/w$ ($w$ = rotational speed of the engine, and $\alpha$ = angle of rotation), and since $I = Kw$, $$V_1 = (Kw\alpha/C\omega) = K(\alpha/c)$$

Since $K/C$ is a constant, it follows that:

$$V_1 = \lambda\alpha$$

Consequently, the voltage $V_1$ at the output of integrator 27 will charge to a value proportional to angle $\alpha$ each cycle and thereafter will be discharged completely by the action of transistor 135. Inasmuch as disc 111 has two openings 109 and 110, two sawtooth pulses will be produced by integrator 27 during each complete rotational cycle of the disc. This is illustrated by the curve in solid lines in FIG. 5.

The tachometric generator 3A comprises a current generator 29 and a direct current amplifier 30 and is connected at point B to the output of shaping device 21 (see FIG. 2). Current generator 29, identical in operation to generator 26, comprises a diode-pump consisting of diodes 138, 139 and a condenser 140, a current limiting resistor 141, a filter circuit comprising a condenser 142 and a resistor 143, and a transistor 144 the emitter of which limits the voltage at the terminals of condenser 142 to 0.6 volts. Two diodes 145 and 146 are connected at the output of generator 29 to enable attainment of the ignition advance curve shown in FIG. 6. Without these diodes and under certain adjustment conditions, voltage $V_2$ could assume a value lower than the initial value of voltage $V_1$, which is the voltage available at the wiper arm of a potentiometer 156 controlled by vacuum capsule 155 of sensor 28. Under such conditions there would be no possibility of modification or adjustment of the advance curve since ignition could not occur.

Direct current amplifier 30 supplies at its output a voltage signal $V_2$ in response to the output current signal $I = Kw$ emanating from generator 29. Amplifier 30 comprises a transistor 153, diodes 151 and 152, and resistors 147, 148, 149, and 150 connected as illustrated.

Referring to FIG. 6, a first threshold in the engine advance curve is obtained when voltage $V_2$ reaches the peak of sawtooth $V_1$ (while disregarding the junction voltage VBE of the transistor of comparator 23). It is therefore possible to select the first threshold by adjusting the initial value of $V_1$. This is done by adjusting the position of the wiper arm of potentiometer 156 controlled by the vacuum capsule of device 28. The first slope (see FIG. 6) is determined by adjustable resistance 147 (see FIG. 2), with diode 152 and transistor 153 being in a non-conducting condition.

The second threshold is selected by means of potentiometer 149 and occurs when diode 152 becomes conductive. The second slope is determined by the settings of adjustable resistors 147 and 148, with diode 152 being conductive and transistor 153 being non-conductive.

The third threshold occurs when transistor 153 becomes conductive, and the third slope is determined by the setting of potentiometer 150.

Sensor 28, which in the present example responds to engine vacuum, comprises a manometric capsule 155 consisting in a known fashion of a deformable diaphragm exposed to the action of the low pressure in the intake manifold of the engine. A potentiometer 156 has its wiper arm coupled to the diaphragm and is adjustable to define by means of its movable contact the initial value of voltage $V_1$ which allows the adjustment of the first threshold (see FIG. 6) when the vacuum is zero. The potentiometer also provides for the introduction of an ignition advance factor, in the form of a voltage $V_3$, which will vary as the engine vacuum varies.

Comparator 23 of voltage $V_1 + V_3$ and voltage $V_2$ consists of a transistor 157 and a resistor 158. Comparison is made between the base and the emitter of transistor 157 which, becoming conductive when voltage $V_1 + V_3$ coincides with voltage $V_2$, is in condition to deliver an ignition signal to amplifier 24. Amplifier 24 amplifies the signals suppled by monostable multivibrator 22, when the engine is revolving at low speeds (advance=zero), and by compartor 23, when the engine is running at higher speeds requiring ignition advance. Amplifier 24 receives the current from the collector of transistor 157 of comparator 23 and consists of transistors 159 and 160, resistors 161, 162, 163 and 164, and diode 165. Amplifier 24 controls the operation of transistorized ignition circuit 25.

Transistorized ignition circuit 25 is of a design known in the art and comprises transistors 166 and 167, resistors 168, 169, 170, 171 and 172, diodes 173 and 174, Zener diode 175, and condenser 176. When the state of transistor 160 of amplifier 24 is conductive, transistor 166 is consequently turned on which results in transistor 167 becoming non-conductive. This, in turn, causes the voltage in coil 102 to increase so that, through the distributor, a spark is produced at the appropriate spark plug 106. When transistor 160 is non-conductive, transistor 166 also becomes non-conductive which in turn renders transistor 167 conductive and results in the flow of current in primary winding 103 of coil 102.

In known fashion, Zener diode 175, resistor 171, and condenser 176 constitute protection devices to protect transistor 167 against damage from adverse overvoltages. Diode 173 similarly acts as a protective device for transistors 166 and 167, while diode 174 protects transistor 167 by acting on its base.

Switching circuit 31, which may be of any suitable type known in the art, is connected on one hand to the output of amplifier 24 and on the other hand to the input of comparator 23 at the emitter of transistor 157. Circuit 31 consists of a transistor 177 and resistors 178 and 179 and exhibits a triggering action which prevents any erratic operation of comparator 23 under parasitic and radiation influence.

In operation, the voltage $V_3$ produced by sensing network 28 is added to the voltge output $V_1$ of integrator 27. This composite signal is then compared with the voltage $V_2$ from DC amplifier 30, and a triggering output will be produced by comparator 23 at that instant when the two input signals coincide. As shown in FIG. 6, the circuit according to the present invention will produce a zero ignition advance when the engine is running at or slightly above idling speeds. As the engine speed increases, the engine advance will likewise increase following the solid line curve shown in FIG. 6. Since the voltage signal $V_3$ which is added to voltage $V_1$ is dependent upon engine vacuum, the advance curve will be slightly modified in response to monitored intake vacuum conditions. As shown in FIGS. 5 and 6, the output of integrator 27 and the overall engine advance will follow the solid line curves when no engine vacuum exists, and will shift to the curves shown in dashed lines and broken lines whenever the engine vacuum is weak and strong, respectively. As a result, the overall engine advance curves will be modified so as to accommodate the measured engine variations in vacuum with the result that the engine advance more closely approximate that desired under optimum operating conditions.

The method and device described above allow, by means of simple and conventional electronic devices, and more particularly by introduction of voltage $V_3$ in the output of the integrator of the voltage generator, the attainment of advance curves which comply with the different design and characteristic laws that govern the proper operation of internal combustion engines.

Inasmuch as the present invention is subject to many modifications, variations, and changes in design, it is intended that all matter contained in the foregoing description or shown in the accompanying drawings shall be interpreted as illustrative and not in a limiting sense.

What is claimed is:

1. In combination with an internal combustion engine, apparatus comprising a current generator having a current output proportional to speed of rotation of the engine, said current generator supplying an integrator which produces a sawtooth output signal $V_1$, means for providing an output signal $V_3$ dependent on at least one of the internal combustion engine operation parameter, means adding signals $V_1$ and $V_3$ to produce a voltage $V_1 + V_3$ proportional to angular offset $a$, means feeding voltage $V_1 + V_3$ to one input of a pulse generator, a tachometric generator supplying a voltage $V_2$ proportional to the speed of rotation of the engine to another input of the pulse generator, said pulse generator producing a pulse controlling engine ignition when the voltage $V_1 + V_3$ coincides with voltage $V_2$ consideration being given to a proportionality constant, said pulse generator comprising comparator means having input terminals connected to receive voltages $V_1 + V_3$ and $V_2$ for delivering a signal to the ignition device when said voltages are coincident by means of an amplifier; and further comprising a monostable multivibrator connected to apply an output signal thereof to the ignition device directly by means of the amplifier, and a switching circuit connected on one hand to the output of the amplifier and on the other hand to at least one of the inputs of the comparator, said switching circuit being responsive to the triggering of ignition pulses to reinforce said pulses thereby isolating the circuit from the effects of spurious signals.

* * * * *